July 18, 1933.  E. H. HOLMES  1,918,843
CLAMPING BRACKET
Filed March 21, 1931
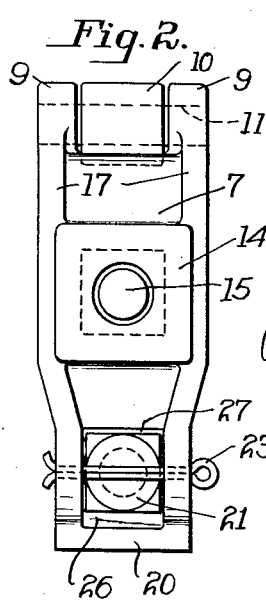
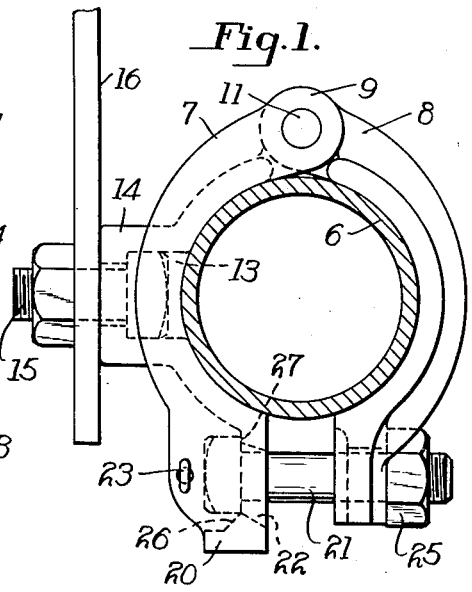
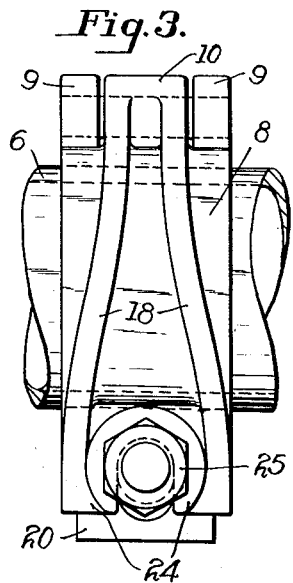
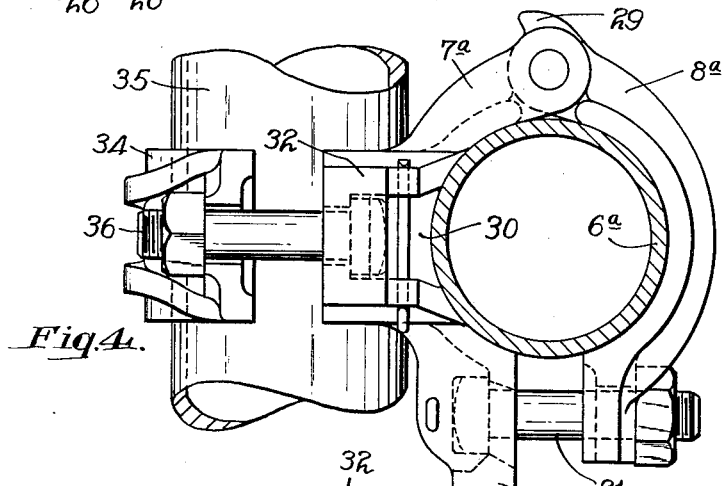
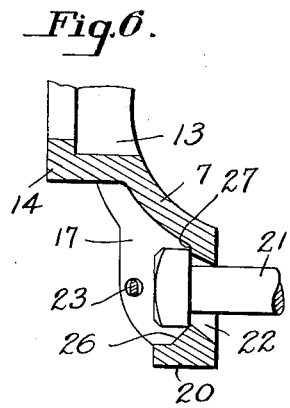
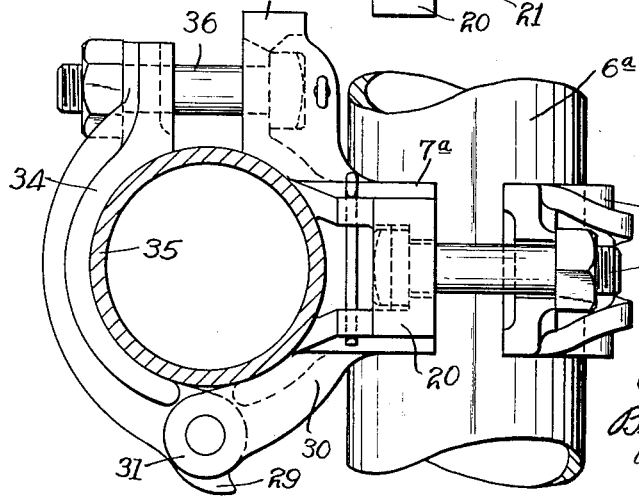
INVENTOR
Edward H. Holmes,
By Archworth Martin,
Attorney.

Patented July 18, 1933

1,918,843

UNITED STATES PATENT OFFICE

EDWARD H. HOLMES, OF McKEES ROCKS, PENNSYLVANIA, ASSIGNOR TO FORT PITT MALLEABLE IRON COMPANY, OF McKEES ROCKS, PENNSYLVANIA, A CORPORATION OF PENNSYLVANIA

CLAMPING BRACKET

Application filed March 21, 1931. Serial No. 524,341.

My invention relates to clamping brackets, and more particularly to brackets of yoke-like form that may be clamped to posts or structural work, for the purpose of supporting guy members, truss members, landing platforms, etc.

One object of my invention is to provide a clamping bracket that is convenient of manipulation and may be readily applied to or removed from a supporting member.

Another object of my invention is to provide a clamping bracket that is of great strength for a given weight of material.

Still another object of my invention is to provide an improved manner of mounting the clamping bolt on the yoke-like bracket members.

Some of the forms which my invention may take are shown in the accompanying drawing wherein Figure 1 is a plan view of a bracket applied to a tubular post; Fig. 2 is a view looking from the left hand side of Fig. 1; Fig. 3 is a view taken from the right hand side thereof; Fig. 4 is a view similar to Fig. 1, but showing a modified structure; Fig. 5 is a side elevational view of the structure of Fig. 4, and Fig. 6 is a sectional view of a portion of the structure of Fig. 1.

The bracket is shown as positioned upon a post or upright 6, and comprises clamping members 7 and 8.

The clamping member 7 is shown as having a pair of axially-spaced knuckle portions 9, and the clamping member 8 as having a knuckle portion 10 disposed between the portions 9. A pin 11 extends through the knuckles 9 and 10 and serves as a pivotal connection for the members 7 and 8.

The clamping member 7 has a polygonally-shaped recess 13 formed in one side thereof, and a perforated boss 14 through which a bolt 15 extends, the head of the bolt lying within the recess 13 and held thereby against turning. The bolt 15 and its nut serve as a means for connecting a truss member 16 or the like to the clamp.

The clamping member 7 is provided with strengthening ribs 17 that are disposed along the edges of such member so as not to interfere with the location of the boss 14 and the bolt 15, while the clamping member 8 is provided with ribs 18 that extend from the outer end of the member toward the center line thereof, and merging with the knuckle 10.

The forward end of the clamping member 7 is provided with an extension 20 that has a polygonally-shaped recess open at its outer side for the reception of the head of a clamping bolt 21, the inner wall of the recess having a diagonally-extending perforation 22 that permits movement of the shank of the bolt 21 therethrough when placing the bolt in position. A cotter pin 23 extends through perforations in the sides of the extension 20 for preventing displacement of the bolt 21 during shipping and handling of the bracket.

The forward end of the clamping member 8 is bifurcated as indicated at 24, so that the bolt 21 may be swung to and from the position shown in Figs. 1 to 3, when the nut 25 is loosened. Tightening of the nut 25 will, of course, bring the bracket members 7 and 8 into clamping engagement with the post 6.

An important feature of this invention resides in the provision of an angular shoulder or fillet 26 at the outer side of the recess within the extension 20, so that when the nut 25 is tightened, the head of the bolt will be slid toward the center of the bracket, and will rest firmly on the flat bottom portion 27 of the recess, thus bringing the bolt head as near as possible to the middle of the bracket. The outer extremity of the extension 20 is thus relieved of clamping stresses, and such stresses imposed more closely to the body portion of the bracket, thereby shortening the leverage and increasing the strength of the device.

Another important feature of my invention involves the angular or diagonally-extending perforation 22 that permits the bolt to be swung in a pivotal manner upon its head when the nut 25 is loosened. The inclined surface 26 facilitates this pivotal or swinging movement. By this arrangement, the bolt 21 may be of various well-known standard forms instead of being in the form of an eye bolt which would have to have a pivotal mounting in the extension 20 of the bracket 7. The drilling and mounting of these eye bolts involves considerable expense, and furthermore, such structures do not possess the strength of the present arrangement, since here the clamping strains are imposed directly through the head of the bolt upon the bottom wall of the recess, instead of being transmitted to the clamping bracket through a pivot pin as in the case of eye bolts.

Referring now to Figs. 4 and 5, I show bracket members 7a and 8a that correspond to the bracket members 7 and 8, except for two features which will be hereinafter described. The first feature consists of a tail piece or lug 29 that is mounted on the knuckle of the member 8a and which will abut against the rear side of the clamping member 7a when the member 8a is swung to open position, to thereby prevent the member 8a swinging back so far as to render inconvenient the assembling of the bracket with a post or brace member.

The other feature of distinction over the structures of Figs. 1 to 3 resides in the elimination of the boss 14, and the substitution therefor of a saddle member 30 that is preferably formed integrally with the clamping member 7a and is similar in form to the said member 7a, in that it carries spaced knuckles 31 that correspond to the knuckles 9 of Fig. 3, and a recessed extension 32 that corresponds to the extension 20 of the bracket member 7. A clamping member 34 is formed similarly to the clamping members 8 and 8a, so that it may be brought into clamping engagement with a boss or truss member 35, by means of a clamping bolt 36 that corresponds to the bolts 21 of Figs. 1 and 4. The bracket members 7a—8a and 30—35 are disposed in planes that are perpendicular to one another, so that they can be employed to maintain in rigidly assembled relation two structural members 6a and 35 that are disposed at right angles to one another.

I claim as my invention:—

1. Bracket structure comprising a pair of clamping members connected together at one end, a recessed extension on the other end of one clamping member for receiving a bolt head, and an extension on the adjacent end of the other clamping member for engagement with a nut carried by the bolt, the bottom wall of the said recess being substantially flat and perforated for the reception of the bolt shank and having an inclined portion extending from the bottom wall of the recess to the outermost vertical wall thereof.

2. Bracket structure comprising a pair of clamping members connected together at one end, a recessed extension on the other end of one clamping member for receiving a bolt head, an extension on the adjacent end of the other clamping member for engagement with a nut carried by the bolt, the bottom wall of the said recess being substantially flat and perforated for the reception of the bolt shank and having an inclined portion extending from the bottom wall of the recess to the outermost vertical wall thereof, and the said perforation extending in a direction diagonal to the plane of the said bottom wall.

3. Bracket structure comprising a pair of clamping members pivotally connected at one end, a recessed extension on the other end of one of the members for the reception of a bolt head, the bottom wall of said recess having a perforation that is elongated in a direction longitudinally of the extension and extending axially in a diagonal direction, and an inclined wall portion extending from the outer end of said perforation to a mid point on the outermost wall of said recess.

EDWARD H. HOLMES.